United States Patent
Wu et al.

(10) Patent No.: US 6,719,670 B1
(45) Date of Patent: Apr. 13, 2004

(54) ONE-WAY OUTPUT DEVICE WITH A CLOCKWISE-COUNTERCLOCKWISE ROTATING UNIT

(75) Inventors: Mu-Chuan Wu, Tainan Hsien (TW); Joseph Wu, Tainan Hsien (TW)

(73) Assignee: Tonic Fitness Technology, Inc., Tainan Hsien (TW)

( * ) Notice: Subject to any disclaimer, the term of this patent is extended or adjusted under 35 U.S.C. 154(b) by 0 days.

(21) Appl. No.: 10/442,159

(22) Filed: May 21, 2003

(51) Int. Cl.$^7$ .......................... A63B 22/06; F16H 48/06; F16H 57/08
(52) U.S. Cl. .......................... 482/57; 475/149; 475/331; 482/63
(58) Field of Search ...................... 482/57–65; 475/149, 475/352, 331, 344

(56) References Cited

U.S. PATENT DOCUMENTS

| | | | | |
|---|---|---|---|---|
| 1,644,222 A | * | 10/1927 | Baker | .......................... 475/344 |
| 1,820,061 A | * | 8/1931 | Flagg | .......................... 475/344 |
| 6,475,122 B2 | * | 11/2002 | Wu | .......................... 482/57 |
| 6,585,620 B1 | * | 7/2003 | Bae | .......................... 475/331 |
| 6,629,905 B1 | * | 10/2003 | Sesselmann et al. | ........ 475/149 |

* cited by examiner

Primary Examiner—Stephen R. Crow
(74) Attorney, Agent, or Firm—Bacon & Thomas, PLLC

(57) ABSTRACT

A one-way output device with a clockwise-counterclockwise unit includes a lengthwise hollow sleeve formed with a recessed fixing base. An inner gear cover is covered on the fixing base. A solar gear and two planetary gears are positioned between the fixing base and the inner gear cover, and the two planetary gears mesh with the inner teeth of the inner gear cover. A shaft is fitted thereon with an inner and an outer drive ring positioned interposing each other and fitted thereon with a clutch with balls. The shaft has its opposite ends respectively extending out of the fixing base and the inner gear cover and stably positioned. The inner and the outer drive ring and the balls are respectively fitted with the solar gear and the inner gear cover, carrying out one-way output whether the shaft is driven to rotate clockwise or counterclockwise.

3 Claims, 9 Drawing Sheets

(A-A)

(B-B)

(C-C)

(D-D)

(E-E)

ONE-WAY OUTPUT DEVICE WITH A CLOCKWISE-COUNTERCLOCKWISE ROTATING UNIT

BACKGROUND OF THE INVENTION

1. Field of the Invention

This invention relates to a one-way output device with a clockwise-counterclockwise rotating unit, particularly to one able to carry out one-way output whether its shaft is driven to rotate clockwise or counterclockwise by an external force, so that it can actuate an externally connected subordinate wheel (a flywheel, a gear or a belt wheel) to always rotate in the same direction.

2. Description of the Prior Art

A conventional sports apparatus usually has its shaft driven to actuate a subordinate wheel (a flywheel, a gear or a belt wheel) to rotate and drive the resisting member of the sports apparatus to function. When the shaft is driven to rotate clockwise, the subordinate wheel will also rotate clockwise, and when the shaft is driven to rotate counterclockwise, the subordinate wheel will rotate counterclockwise as well. The process of changing rotating clockwise into rotating counterclockwise of the subordinate wheel is as follows: rotating clockwise rapidly→rotating clockwise at a decreasing speed→stopping rotating→rotating counterclockwise slowly rotating counterclockwise rapidly. Evidently, in the process of changeover of its rotating direction, the subordinate wheel has a stag of keeping motionless. In this case, if the resisting member of the sports apparatus is a generator driven by the subordinate wheel, power generated by the generator will become unstable due to unconstant rotating speed of the subordinate wheel, and even a condition of power interruption may happen. Thus, the electric power supplied by the generator for the sports apparatus may drop sharply and stop the operation of the other devices which need electricity supplied by the generator, such as an indicator, an electrically controlled device and the like, thus giving rise to much inconvenience and trouble to a user.

To improve the above-mentioned defect of the conventional sports apparatus, a one-way output device of a sports apparatus has been devised, as disclosed in U.S. Pat. No. 6,475,122. According to the design of this patent, a flywheel can be actuated to always rotate in the same direction, whether the pedal of the sports apparatus is driven to rotate clockwise or counterclockwise. However, such a design is too complicated in matching of the components and interaction among them, and it is also of vast size.

SUMMARY OF THE INVENTION

The objective of the invention is to offer a one-way output device with a clockwise-counterclockwise rotating unit, able to carry out one-way output and transmission, and having a compact size.

The one-way output device with a clockwise-counterclockwise rotating unit in the present invention includes a lengthwise hollow fixing sleeve having one end expanded into a recessed fixing base and the other end fitted with a first bearing. The fixing base is formed with a recessed stepped surface at an inner side facing the fixing sleeve for receiving a second bearing and has a plurality of support rods protruding outward around the outer circumference of the stepped surface, with the outer circumferential side of the fixing base fitted thereon with a dry bearing. The fixing base is provided inside with an annular solar gear, a pair of planetary gears and a positioning ring. The solar gear has one side formed with a shaft protruding outward and facing the fixing sleeve for fitting a second bearing thereon and the other side formed with a chamber. The two planetary gears respectively having two stages are positioned between the fixing base and the positioning ring, having their inner-stage gears respectively meshing with the opposite outer sides of the solar gear and the outer sides of their outer-layer gears pressed by the positioning ring which is then secured on the support rods of the fixing base. An inner gear cover able to be connected with an external subordinate wheel is covered on the outer side of the fixing base, and a dry bearing is positioned between the inner gear cover and the fixing base, rendering the inner gear cover able to rotate. The inner gear cover has its center portion bored with a through hollow for receiving a third bearing and its inner circumferential wall formed with inner teeth for meshing with the outer-stage gears of the two planetary gears. The inner gear cover is further formed at one side with a chamber facing the fixing base and matching with the solar gear. A shaft able to rotate clockwise and counterclockwise by an external force has the end near the fixing base fixed thereon with a polygonal inner drive ring and a polygonal outer drive ring having a position angular difference between them. The two polygonal drive rings have their outer circumferential surfaces fitted thereon with a cylindrical clutch, which is formed in its outer circumferential surface with a plurality of inner side and outer side holes respectively matching with the inner and the outer drive ring, with each inner side and outer side hole respectively receiving a ball therein. The shaft has its opposite ends respectively extending out of the fixing sleeve and the inner gear cover and clasped in position by a retaining ring. Thus, the inner and the outer drive ring and the clutch together with its inner side and outer side balls are respectively received in the chambers of the solar gear and the inner gear cover. By so designing, the inner gear cover can be actuated to always rotate clockwise whether the shaft is driven to rotate clockwise or counterclockwise.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
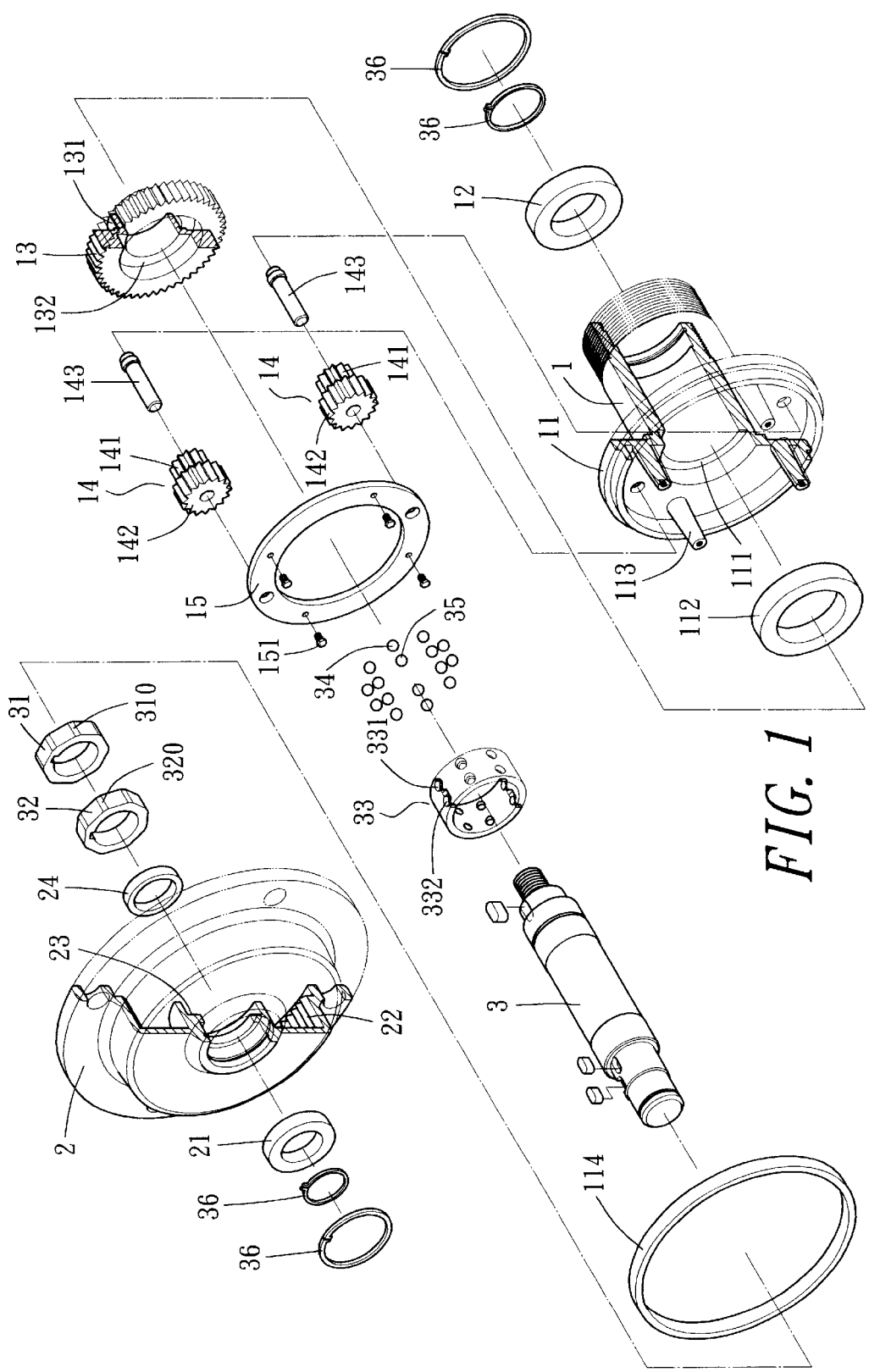
FIG. 1 is an exploded perspective view of a one-way output device with a clockwise-counterclockwisse rotating unit in the present invention.

A preferred embodiment of a one-way output device with a clockwise-counterclockwise rotating unit in the present invention, as shown in FIG. 1, includes a fixing sleeve 1, an inner gear cover 2 and a shaft 3 as main components combined together.

The fixing sleeve 1 has a lengthwise ho low interior, having its front end expanded into a recessed fixing base 11 and its rear end fitted with a first bearing 12. The fixing base 111 is formed with a recessed stepped surface 111 at a rear side facing the fixing sleeve 1 for receiving a second bearing 112, having a plurality of support rods 113 protruding outward and positioned in a circle around the outer circumference of the stepped surface 111, with the outer circumferential surface of the fixing base 11 able to be fitted thereon with a dry bearing 114.

Figure 2:
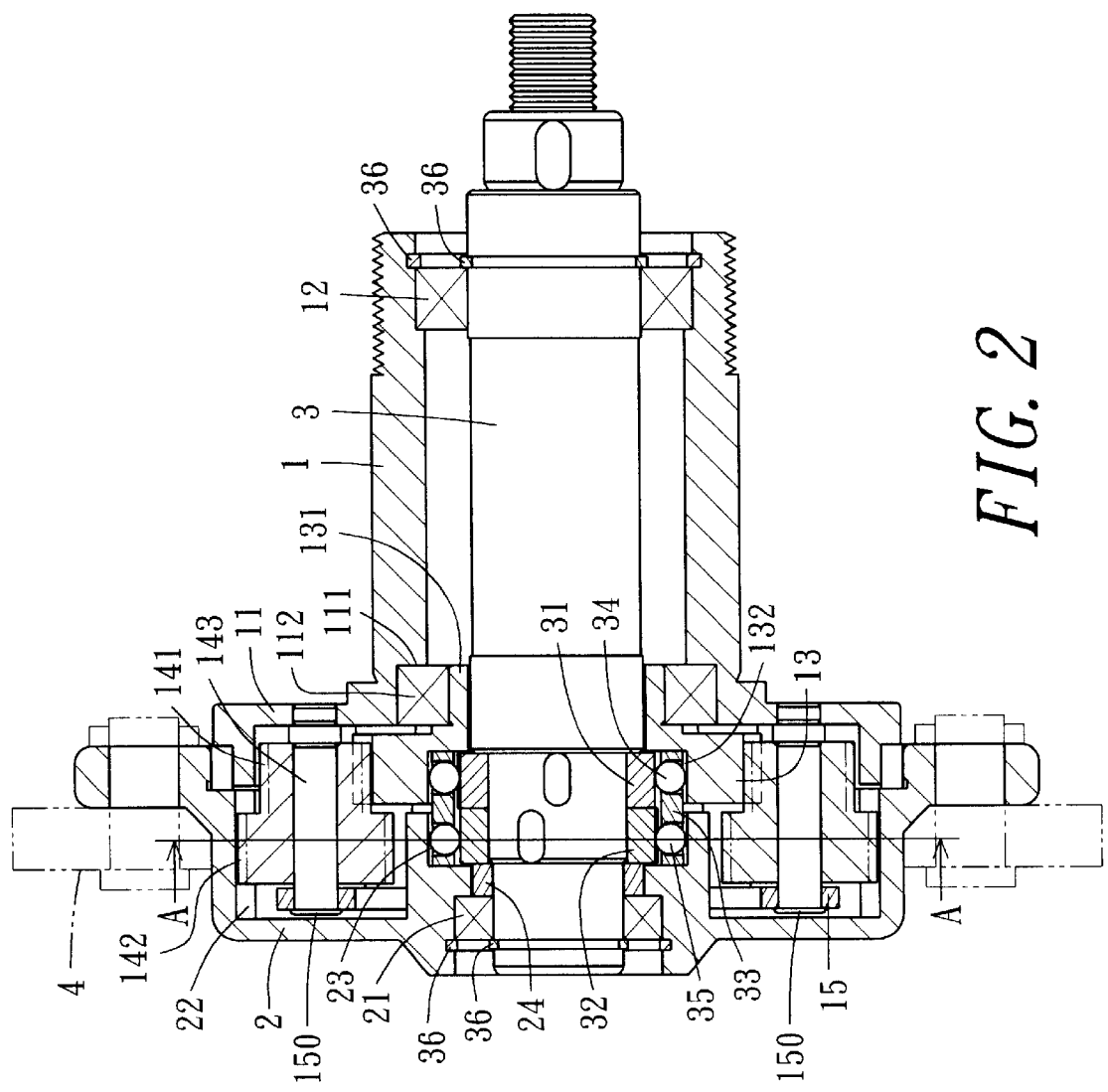
FIG. 2 is a side cross-section a view of the one-way output device with a clockwise-counterclockwise rotating unit in the present invention.

The fixing base 11 is fitted inside with an annular solar gear 13, a pair of planetary gears 14 and a positioning ring 15. The solar gear 13 has one side formed with an axis 131 protruding outward and facing the fixing sleeve 1 and inserting in a second bearing 112 and the other side formed with a chamber 132, as shown in FIG. 2. The two planetary gears 14 respectively having two layers are positioned between the fixing base 11 and the positioning ring 15 by pins 143, having their inner-layer gears 141 respectively meshed with the opposite outer sides of the solar gear 13, and the outer sides of their outer-stage gears 142 pressed by the positioning ring 15 which is then fixed on the support rods 113 of the fixing base 11 by rivets 151.

The inner gear cover 2 can be connected with an external subordinate wheel 4 (like the transmission gear of a sports apparatus or a belt wheel), as shown by the dotted lines marked in FIG. 2. The inner gear cover 2 is covered around the outer side of the fixing base 11, and the dry bearing 114 is positioned between the inner gear cover 2 and the fixing base 11, letting the inner gear cover 2 able to rotate freely, as shown in FIG. 2. Besides, the inner gear cover 2 has its center portion formed with a through hollow for receiving a third bearing 21 therein and its inner circumferential surface formed with inner teeth 22 for meshing with the outer-stage gears 142 of the two planetary gears 14, as shown in FIG. 2. The inner gear cover 2 is further formed in one side with a chamber 23 facing the fixing base 11 and matching with the solar gear 13, with a partition ring 24 positioned between the chamber 23 and the third bearing 21.

Figure 3:
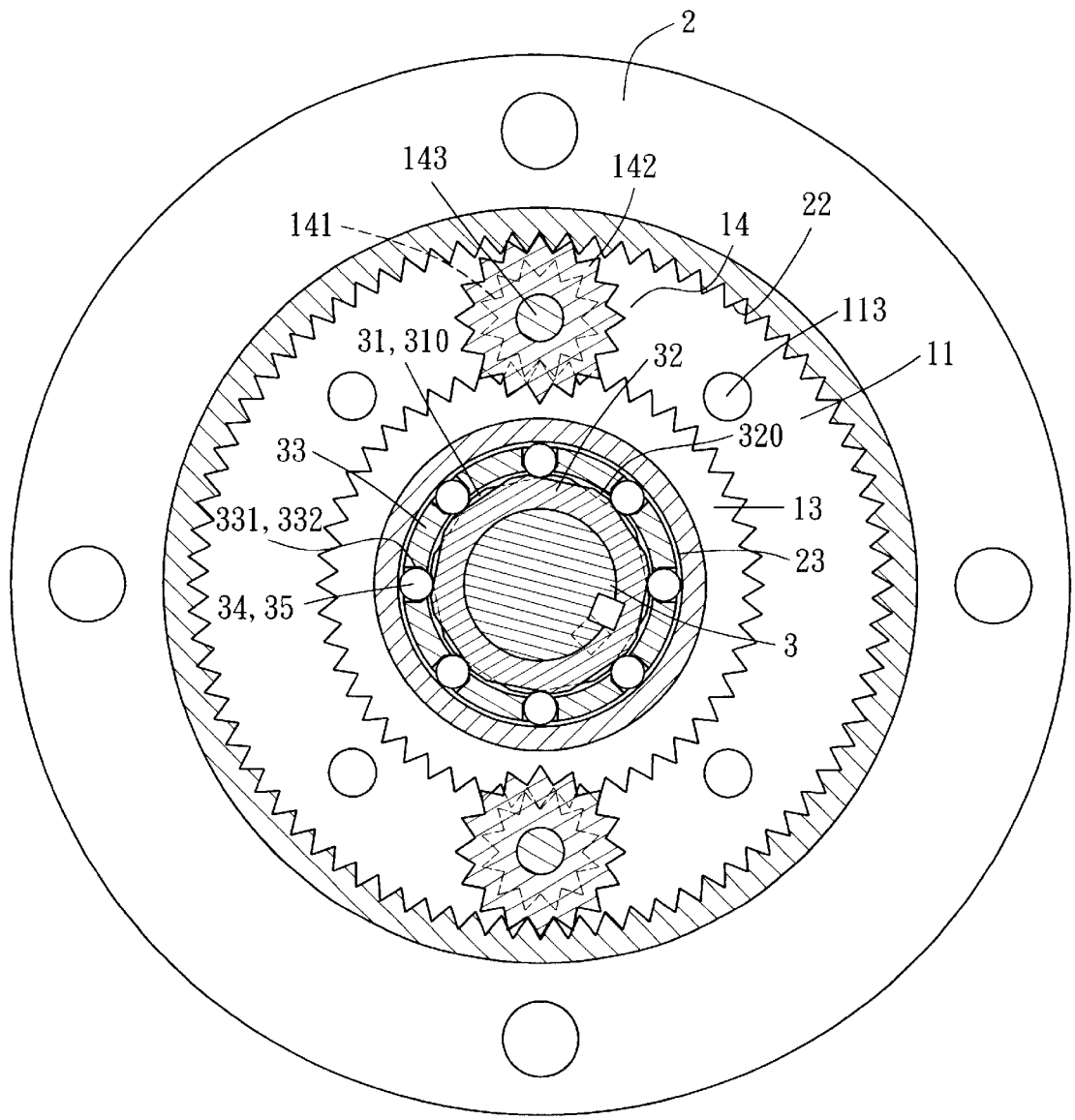
FIG. 3 is a cross-sectional view of the line A—A in FIG. 2.

The shaft 3 is inserted through both the fixing sleeve 1 and the inner gear cover 2, able to be driven to rotate clockwise or counterclockwise by an external force, such as the pedal of a sports apparatus, the pedal of the manually-controlled swinging arm of a rehabilitation device. The shaft 3 has one end near the fixing base 111 secured thereon with an octagonal inner drive ring 31 and an octagonal outer drive ring 32 rotating together and forming a position angular difference (about 23 degrees) between them, as shown in FIG. 3. The inner and the outer drive rings 31, 32 have their outer circumferential surfaces fitted thereon with a cylindrical clutch 33, as shown in FIGS. 1 and 2. The cylindrical clutch 33 is formed in its outer circumferential surface with plural inner side holes 331 and outer side holes 332 arranged lengthwise and linearly for respectively matching with the circumferential surfaces of the inner and the outer drive ring 31 32, with each hole 331, 332 respectively receiving a ball 34, 35 therein.

In assembling, as, shown in FIGS. 2 and 3, firstly, the second bearing 112 is fitted in the stepped surface 111 of the fixing base 11, and the solar gear 13 has its axis 131 inserted in the second bearing 112, able to pivotally rotate: freely. Then, the two planetary gears 14 are positioned on the fixing base 11 by pins 143 and have their inner-stage gears 141 respectively meshed with the opposite sides of the solar gear 13, and have the outer sides of their outer-stage gears 142 pressed by the positioning ring 15, which is then secured on the support rods 113 of the fixing base 11 by rivets 151. Subsequently, the inner and the outer drive rings 31 32, and the clutch 33 together with its balls 34, 35 are mounted on the shaft 3, which then has its rear end inserted orderly through the solar gear 13 and the fixing sleeve 1 as well as the first bearing 12, with a retaining ring 36 clasped on the shaft 3 to keep the drive rings 31, 32 and the clutch 33 stably, as shown in FIG. 2. At this time, the inner drive ring 31 and the inner half side of the clutch 33, fitted on the inner drive ring 31, as well as the balls 34 are together received in the chamber 132 of the solar gear 13, as shown in FIG. 2.

Next, the dry bearing 114 is fitted around the fixing base 11, and the inner gear cover 2 is covered on the outer side of the fixing base 11, and the shaft 3 has its front end inserted through the partition ring 24 and the first bearing 21, with a retaining ring 36 clasped on the shaft 3 to keep the partition ring 24 and the first bearing stably. At this time, the outer drive ring 32 and the outer half side of the clutch 33 fitted on the outer drive ring 32, as well as the ball s 35 are together received in the chamber 23 of the inner gear cover 2, as shown in FIG. 2, and the two planetary gears 14 respectively have their outer-stage gears 142 meshed with the inner teeth 22 on the inner circumferential surface of the inner gear cover 2. Thus, the fixing sleeve 1, the inner gear cover 2 and the other components are all mounted on shaft 3, only the balls 34, 35 respectively received in the chambers 132, 23 of the solar gear 13, and the inner gear cover 2 do not resist against the inner circumferential walls of chambers 132, 23 when the shaft 3 is kept motionless.

In using, the one-way output device with a clockwise-counterclockwise rotating unit in this invention is first combined with a sports apparatus or a rehabilitation device, letting the sports apparatus (such as a stationary bike, an oval walking machine and the like) or the operating rod of a hand (foot) rehabilitation device connected with the shaft 3 of the one-way output device so as to actuate the shaft 3 to rotate clockwise or counterclockwise .

Figure 4:
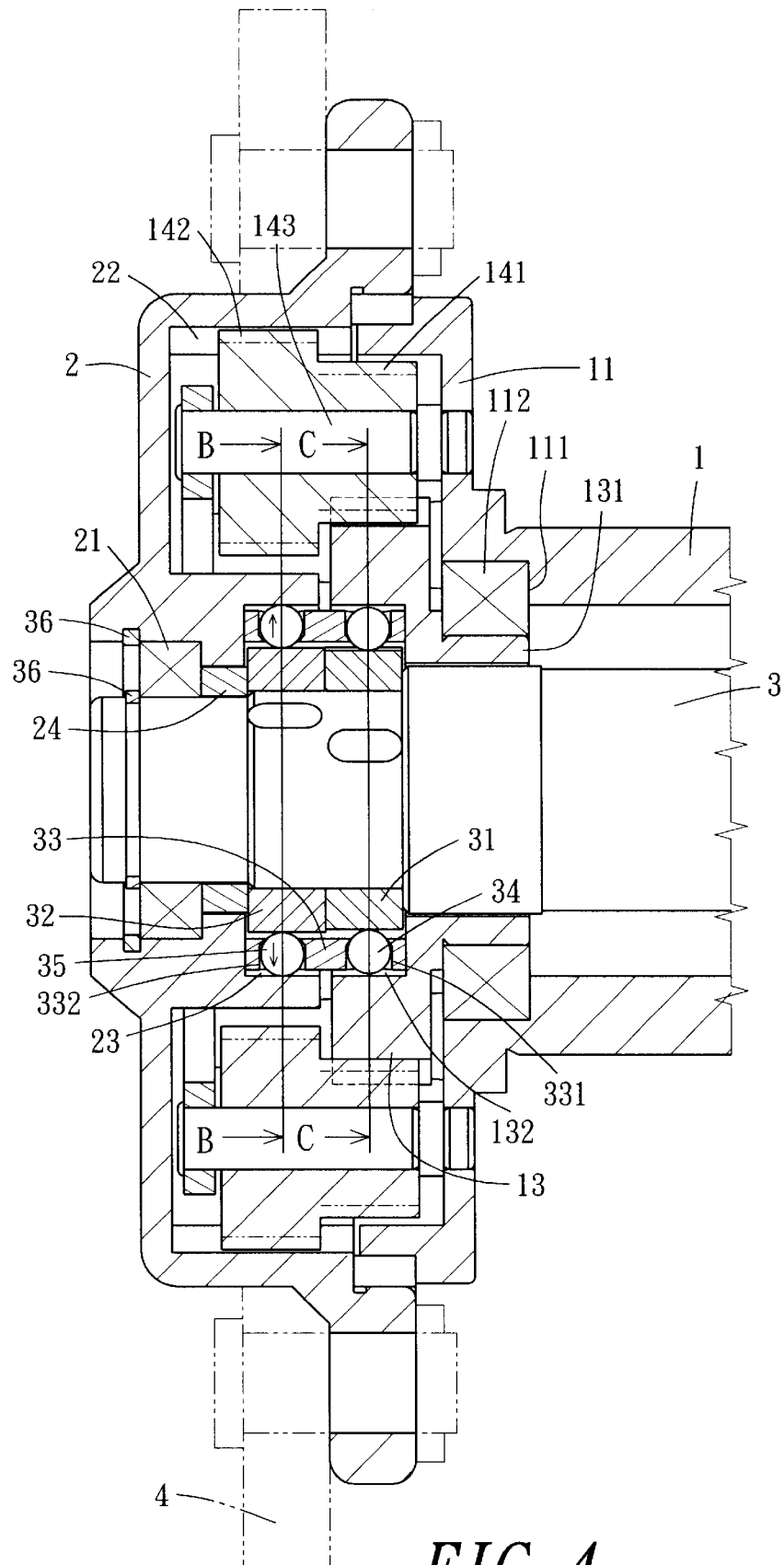
FIG. 4 is a side cross-sectional view of the one-way output device with a clockwise-counterclockwise rotating unit in the present invention, indicating its shaft driven to rotate clockwise.
Figure 5:
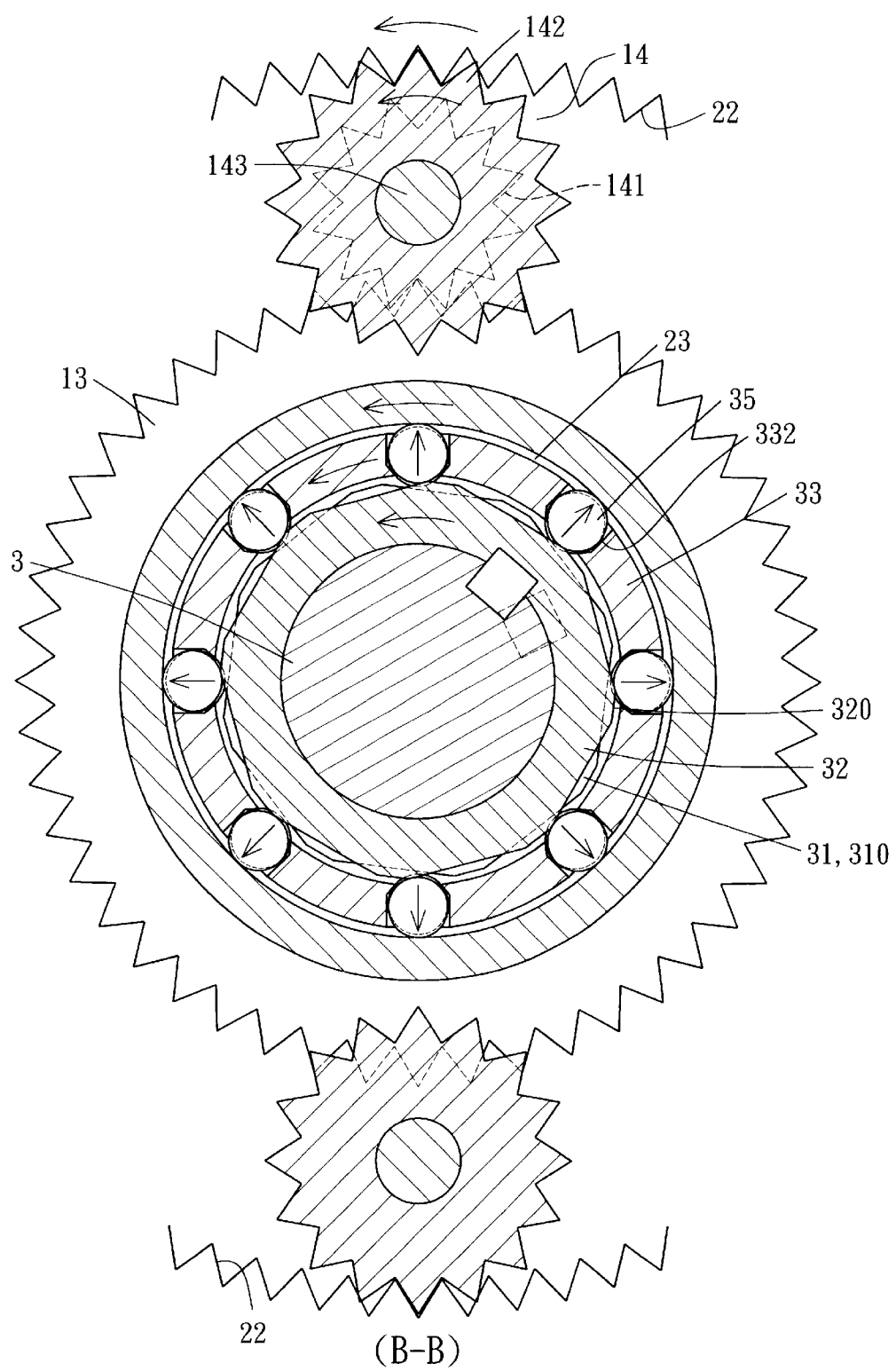
FIG. 5 is a cross-sectionaal view of the line B—B in FIG. 4, indicating the outer side balls of a cylindrical clutch actuating an inner gear cover to rotate clockwise.
Figure 6:
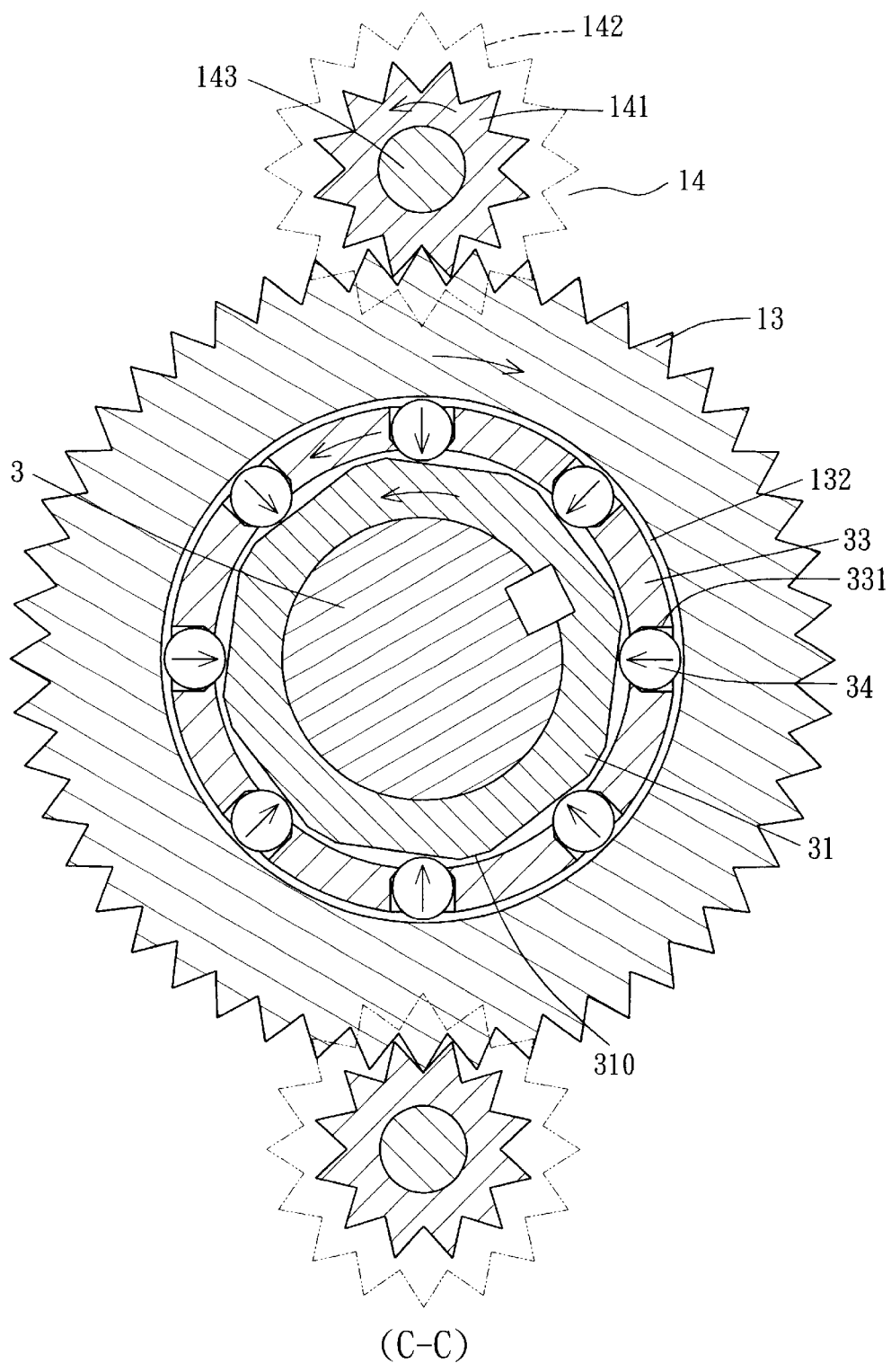
FIG. 6 is a cross-sectional view of the line C—C in FIG. 4, indicating planetary gears actuating a solar gear to rotate counterclockwise idly.

By so designing, when shaft 3 is driven to rotate clockwise, as shown in FIG. 4, the outer drive ring 32 will rotate clockwise for an angle and have the turning corners 320 of its outer circumferential surfaces pushing the balls 35 in the outer side hole 332 of the clutch 33 to move outward and closely push against the inner circumferential wall of the chamber 23 of the inner gear cover 2, as shown in FIG. 5. Thus, the shaft 3 can directly actuate the inner gear cover 2 to rotate clockwise together with its externally connected subordinate wheel (not shown) at the same time. Further, when the shaft 3 is driven to rotate clockwise together with the outer drive ring 32, the inner drive ring 31 will rotate clockwise synchronously. However, due to a position angular difference between the inner and the outer drive ring 31, 32,.when the outer drive ring 32 has the turn i n g corners 320 of its outer circumferential surfaces pushing the outer side balls 35, the inner drive ring 31 just has its outer circumferential surfaces respectively aligned to the inner side balls 34, which are moved in the inner side holes 331 of the clutch 33 and do not contact with the inner circumferential wall of the chamber 132 of the solar gear 13, as shown in FIG. 6.

Under the circumstances, when the inner gear cover 2 is actuated to rotate clockwise by the shaft 3 and the outer drive ring 31 and the outer side balls 35, it will actuate the outer-stage gears 142 of the two planetary gears 14 to rotate clockwise synchronously, and the inner-stage gears 141 of the two planetary gears 14 will actuate the solar gear 13 to rotate counterclockwise. At this time, the solar gear 13 will rotate idly because the inner side balls 34 are moved in the inner side holes 331 of the clutch 33, impossible to hamper clockwise rotation of the inner gear cover 2

Figure 7:
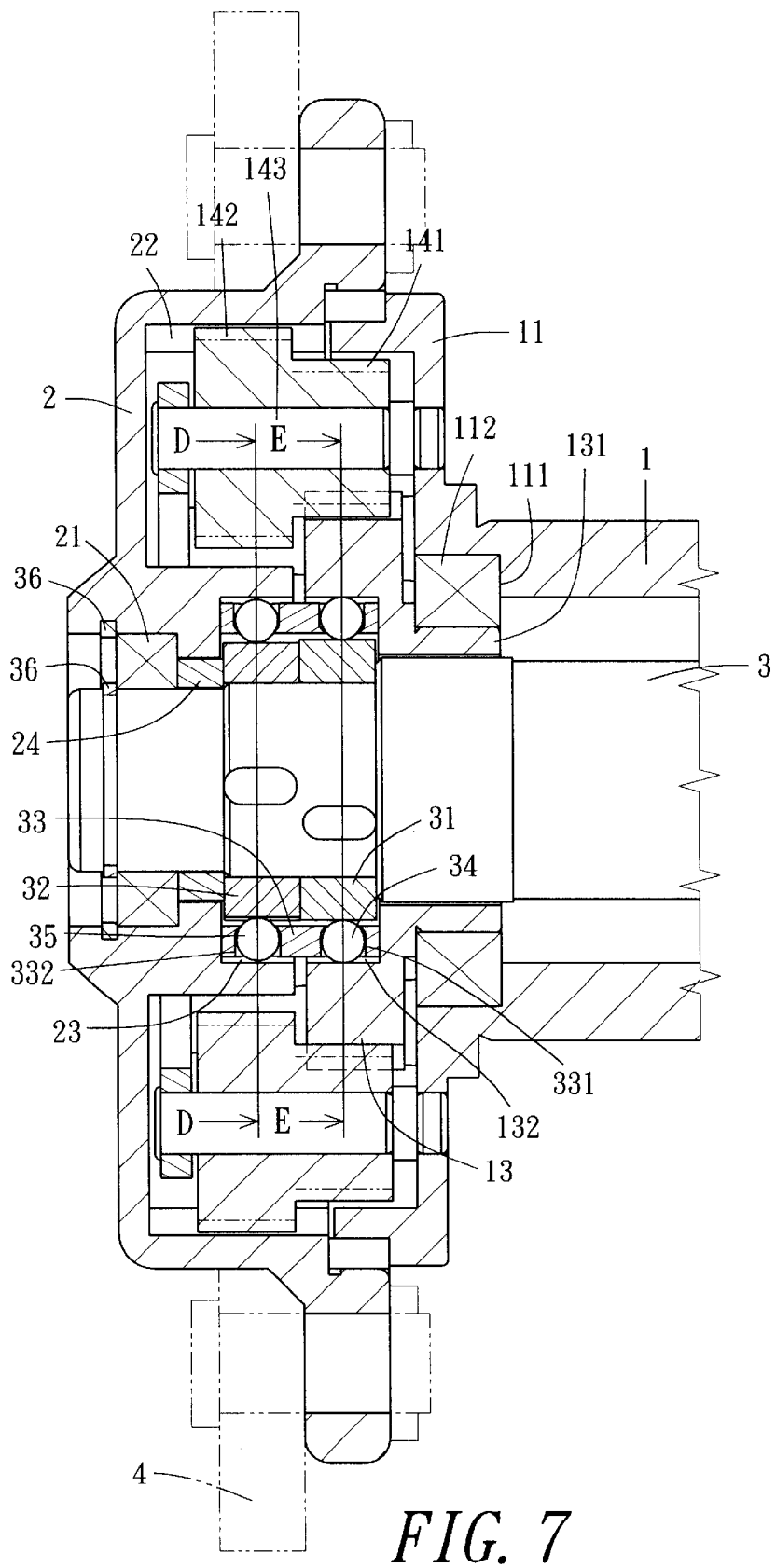
FIG. 7 is a side cross-sectional view of the one-way output device with a clockwise-counterclockwise rotating unit in the present invention, indicating its shaft driven to rotate counterclockwise.
Figure 8:
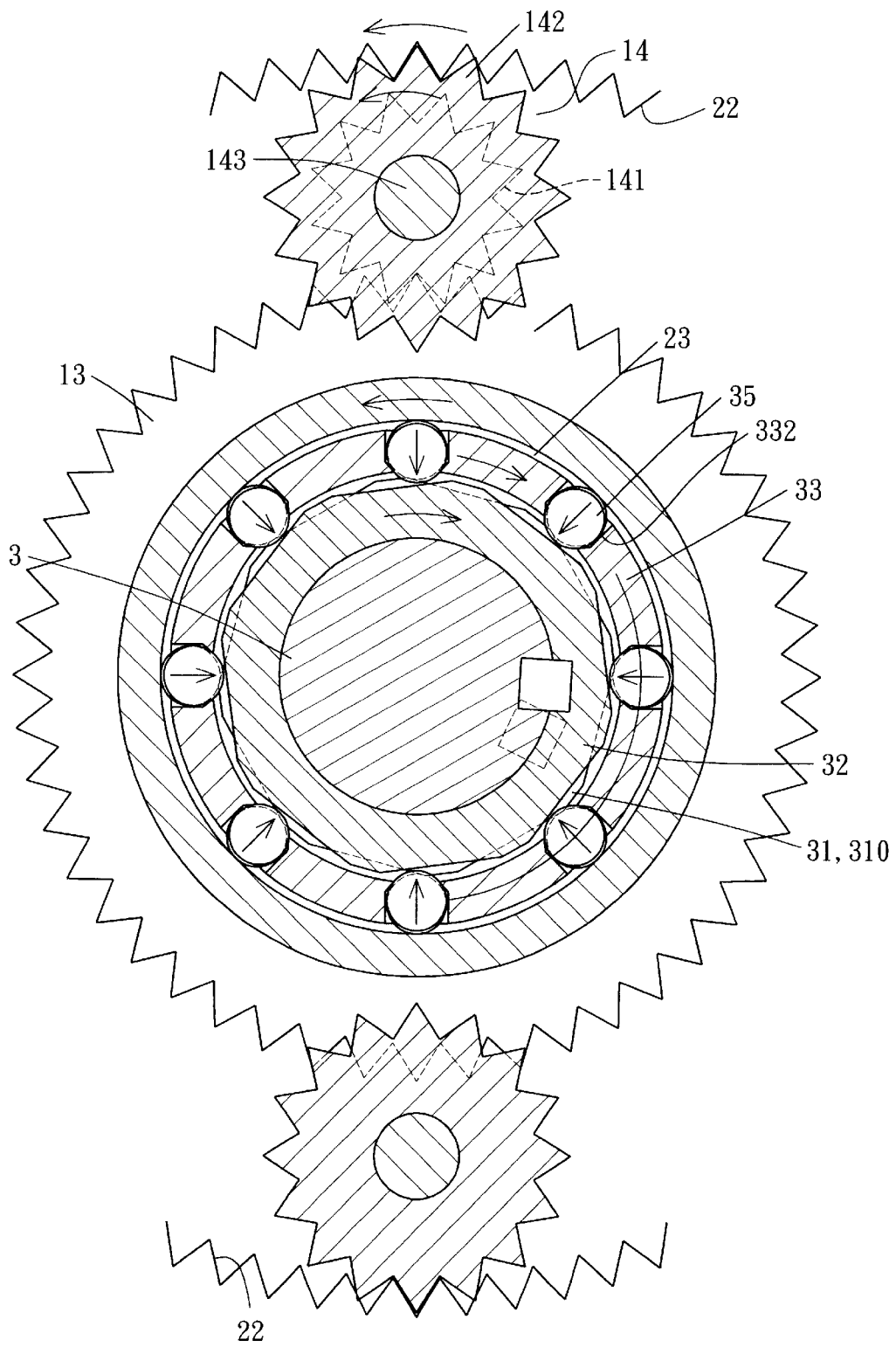
FIG. 8 is a cross-sectional view of the line D—D in FIG. 7, indicating the inner slide balls of the cylindrical clutch actuating the solar gear to rotate counterclockwise.

On the contrary, when the shaft 3 is driven to rotate counterclockwise, as shown in FIG. 7, the inner drive ring 31 will rotate counterclockwise for an angle and have the turning corners 310 of its outer circumferential surfaces pushing the balls 34 in the inner side holes 331 of the clutch 33 to move outward and closely push against the circumferential wall of the chamber 132 of the solar gear 13, as shown in FIG. 8. Thus, when the shaft 3 is driven to rotate counterclockwise together with the solar gear 13, the inner-stage gears 141 of the two planetary gears 14 will be actuated by the solar gear 13 to rotate clockwise, and the outer-stage gears 142 of the two planetary gears 14 will actuate the inner gear cover 2 to rotate clockwise together with its externally connected subordinate wheel (not shown).

Figure 9:
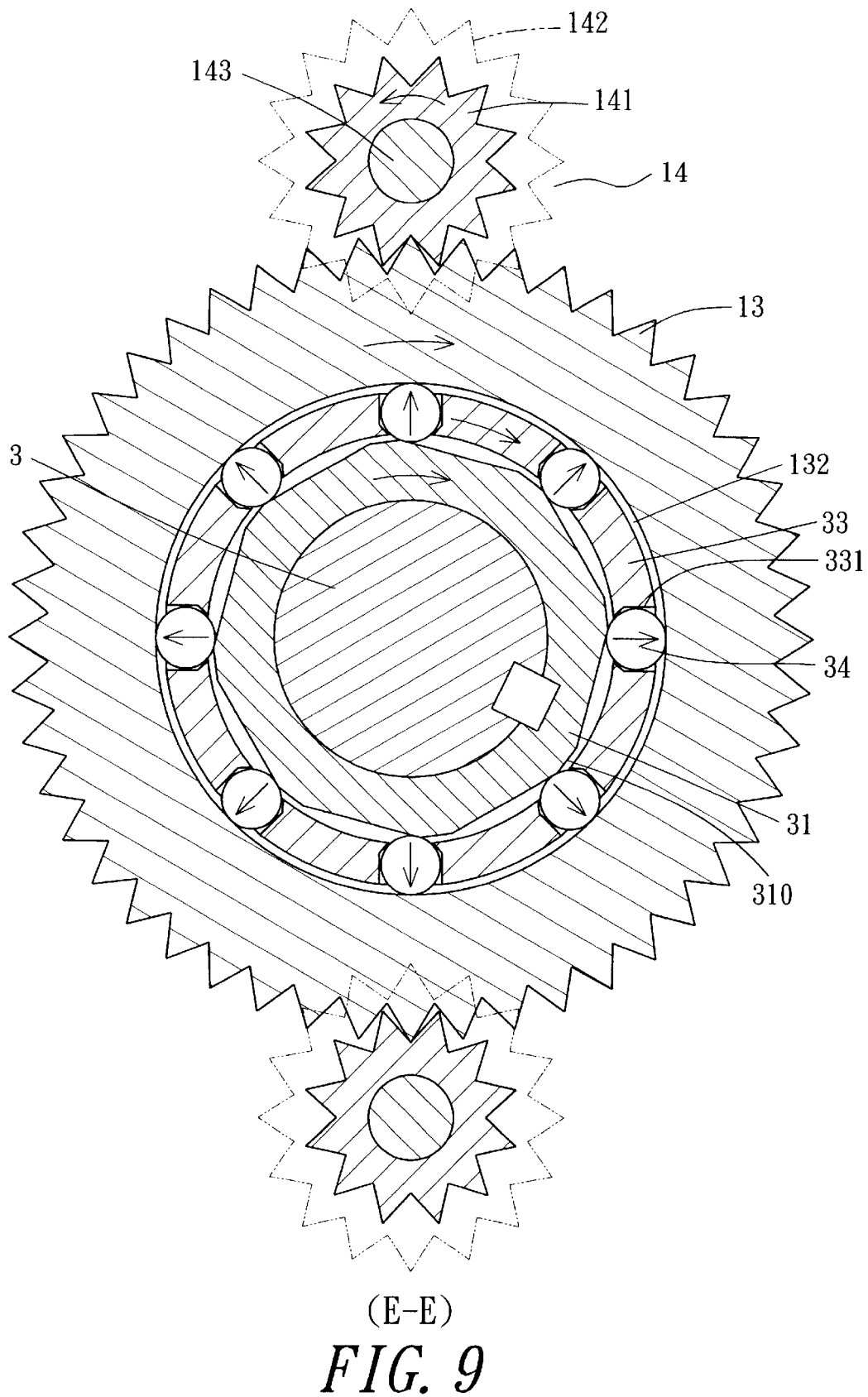
FIG. 9 is a cross-sectional view of the line E—E in FIG. 7, indicating the outer side balls of the cylindrical clutch not contacting with the inner gear cover.

In addition, due to the position angular difference between the inner and the outer drive ring 31, 32, when the shaft 3 actuates the inner drive ring 31 and the outer drive ring 32 to rotate counterclockwise, and the turning corners 310 of the outer circumferential surfaces of the inner drive ring 31 pushes against the inner side balls 34, the outer drive ring 32 just has its outer circumferential surfaces respectively facing the outer side balls 35, which are moved in the outer side holes 322 of the clutch 33 and do not contact with the inner circumferential wall of the chamber 23 of the inner gear cover 2, impossible to hamper the rotation of the inner gear cover 2 at all, as shown in FIG. 9.

As can be understood from the above description, the one-way output device with a clockwise-counterclockwise rotating unit in the present invention has the inner and the outer drive ring 31, 32 respectively formed with a polygonal outer circumferential surface, and the inner and the outer drive ring 31, 32 are formed with a position angular difference between them and also respectively match with the solar gear 13 and the inner gear cover 2. Besides, the solar gear 13 and the planetary gear 14 are designed to rotate in an opposite direction, therefore, the inner gear cover 2 and its externally connected subordinate wheel can be actuated to always rotate clockwise, whether the shaft 3 is driven to rotate clockwise or counterclockwise, able to carry out one-way output and transmission and greatly diminish the size of the device.

While the preferred embodiment of the invention has been described above, it will be recognized and understood that various modifications may be made therein and the appended claims are intended to cover all such modifications that may fall within the spirit and scope of the invention.

We claim:

1. A one-way output device with a clockwise-counterclockwise rotating unit comprising:
    a lengthwise hollow fixing sleeve having one end expanded into a recessed fixing base, said fixing sleeve having the other end fitted with a first bearing, said fixing base formed with a recessed stepped surface at an inner side, said stepped surface fitted with a second bearing, said fixing base provided with a plurality of support rods protruding outward around the outer circumference of said stepped surface, said fixing base having its outer circumferential side fitted thereon with a dry bearing, said fixing base provided inside with an annular solar gear, a pair of planetary gears and a positioning ring, said solar gear having one side formed with a shaft protruding outward and facing said fixing sleeve, said shaft of said solar gear inserted in a second bearing, said solar gear having the other side formed with a chamber, said two planetary gears respectively having two layers, said two planetary gears positioned between said fixing base and said positioning ring by pins, said two planetary gears having their inner-stage gears respectively meshing with the opposite outer sides of said solar gear, said positioning ring pressing the outer sides of the outer-stage gears of said two planetary gears, said positioning ring fixed on said support rods of said fixing base, an inner gear cover able to connect with an external subordinate wheel, said inner gear cover covered on the outer side of said fixing base, between said inner gear cover and said fixing base provided a bearing, said inner gear cover able to rotate freely, said inner gear cover formed with a through hollow in the center for receiving a third bearing, said inner gear cover having its inner circumferential wall formed with inner teeth, said inner teeth meshing with said outer-stage gears of said two planetary gears, said inner gear cover formed with a chamber in one side facing said fixing base, said chamber of said inner gear cover matching with said solar gear;

a shaft inserted in both said fixing sleeve and said inner gear cover, said shaft able to be driven to rotate clockwise or counterclockwise by an external force, said shaft having one end near said fixing base fitted thereon with an inner and an outer drive ring, said inner and said outer drive ring respectively having its outer circumference formed with a polygonal surface, a cylindrical clutch fitted around said inner and said outer drive ring, said clutch having its outer circumferential surface bored with a plurality of inner side and outer side holes, said inner and said outer holes arranged lengthwise and linearly for respectively matching with the outer circumferential surfaces of said inner and said outer drive ring, each said inner and said outer side hole respectively receiving a ball therein, said shaft having its opposite ends respectively protruding out of said fixing sleeve and said inner gear cover and then clasped in position by a retaining ring, said inner drive ring, said outer drive ring, said clutch and said balls together mounted on said shaft and respectively received in said chambers of said solar gear and said inner gear cover; and said inner gear cover able to be actuated to always rotated clockwise whether said shaft is driven to rotate clockwise or counterclockwise.

2. The one-way output device with a clockwise-counterclockwise unit as claimed in claim 1, wherein said inner and said outer drive ring are respectively shaped octagonal and respectively have eight outer circumferential surfaces, and the number of said inner side and outer side balls conform to said outer circumferential surfaces of said inner and said outer drive ring.

3. The one-way output device with a clockwise-counterclockwise rotating unit as claimed in claim 2, wherein the position angular difference between said inner drive ring and said outer drive ring is about 23 degrees.

* * * * *